(12) United States Patent
Bolton

(10) Patent No.: US 11,622,532 B2
(45) Date of Patent: Apr. 11, 2023

(54) RETAINER APPARATUS

(71) Applicant: Bolt-On-QLK, Inc., Mooresville, NC (US)

(72) Inventor: Jamie Bennett Bolton, Mooresville, NC (US)

(73) Assignee: Bolt-On QLK, Inc., Mooresville, NC (US)

( * ) Notice: Subject to any disclaimer, the term of this patent is extended or adjusted under 35 U.S.C. 154(b) by 119 days.

(21) Appl. No.: 17/223,750

(22) Filed: Apr. 6, 2021

(65) Prior Publication Data

US 2021/0227785 A1 Jul. 29, 2021

Related U.S. Application Data

(62) Division of application No. 15/936,729, filed on Mar. 27, 2018, now Pat. No. 10,973,205.

(60) Provisional application No. 62/483,581, filed on Apr. 10, 2017.

(51) Int. Cl.
*A01K 1/04* (2006.01)
*E04H 12/22* (2006.01)
*E04H 15/62* (2006.01)
*E02F 9/28* (2006.01)

(52) U.S. Cl.
CPC ............ *A01K 1/04* (2013.01); *E04H 12/2215* (2013.01); *E04H 12/2246* (2013.01); *E04H 15/62* (2013.01); *E02F 9/28* (2013.01)

(58) Field of Classification Search
CPC .. A01K 1/04; E04H 12/2215; E04H 12/2246; E04H 15/62; E02F 9/28
See application file for complete search history.

(56) References Cited

U.S. PATENT DOCUMENTS

| | | | |
|---|---|---|---|
| 219,203 | A | 9/1879 | Blewett |
| 809,374 | A | 1/1906 | Holden et al. |
| 1,191,275 | A | 7/1916 | Brehl |
| 1,212,639 | A | 1/1917 | Hester |
| 2,087,176 | A | 7/1937 | Webb |
| 2,484,263 | A | 10/1949 | Atkinson |
| 2,589,409 | A | 3/1952 | Leichter |
| 2,671,902 | A | 3/1954 | Grue |
| 2,871,485 | A | 2/1959 | Greco |
| 2,936,460 | A | 5/1960 | Jackson |
| 2,986,743 | A | 6/1961 | Eilen |
| 3,237,904 | A * | 3/1966 | Abruzese ................ E04H 15/62 52/155 |

(Continued)

FOREIGN PATENT DOCUMENTS

| | | |
|---|---|---|
| CN | 2442534 Y | 8/2001 |
| CN | 205728132 U | 11/2016 |

(Continued)

*Primary Examiner* — Tien Q Dinh
*Assistant Examiner* — William L Gmoser
(74) *Attorney, Agent, or Firm* — Brian S. Steinberger; Hilary F. Steinberger; Law Offices of Brian S. Steinberger, P.A.

(57) ABSTRACT

The present invention provides methods and systems for a retainer apparatus that includes a scoop having an exterior surface and an interior surface with a central opening and a predetermined length. A retention device has a base with a length greater than the length of the central opening of the scoop and a flange portion extends upwardly from the base portion and contains at least one opening.

15 Claims, 16 Drawing Sheets

(56) References Cited

U.S. PATENT DOCUMENTS

| | | |
|---|---|---|
| 5,069,166 A | 12/1991 | Ahuna |
| 5,271,196 A | 12/1993 | Fanti |
| 5,342,229 A | 8/1994 | Whitt |
| 5,461,833 A | 10/1995 | Murray et al. |
| 5,832,540 A | 11/1998 | Knight |
| 6,769,139 B1 | 8/2004 | Goldkind |
| 7,353,833 B1 | 4/2008 | Palmer |
| 8,418,267 B2 | 4/2013 | Shaw et al. |
| 9,004,015 B2 | 4/2015 | Krieger |
| 9,303,429 B2 | 4/2016 | Abraham |
| 9,428,933 B2 | 8/2016 | Simonson et al. |
| 9,453,320 B1 | 9/2016 | Peraza |
| 2002/0112675 A1 | 8/2002 | Lesko |
| 2005/0011471 A1 | 1/2005 | Laird |
| 2006/0016950 A1 | 1/2006 | Bright et al. |
| 2010/0224139 A1* | 9/2010 | Krieger ................. A01K 29/00 119/780 |
| 2014/0190419 A1 | 7/2014 | Harding |
| 2015/0013734 A1 | 1/2015 | Krystopher et al. |
| 2019/0098862 A1 | 4/2019 | Bolton |

FOREIGN PATENT DOCUMENTS

| | | |
|---|---|---|
| DE | 202005017146 U1 | 3/2006 |
| GB | 2360451 A1 | 9/2001 |
| KR | 20050112048 A | 11/2005 |

* cited by examiner

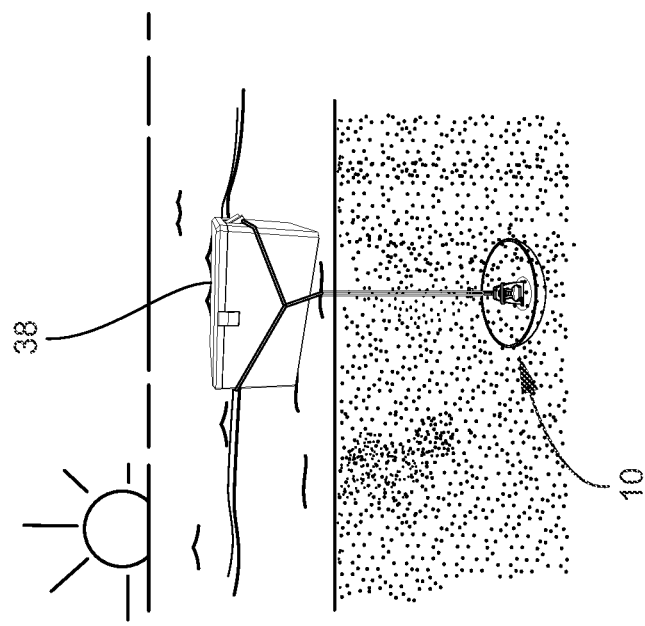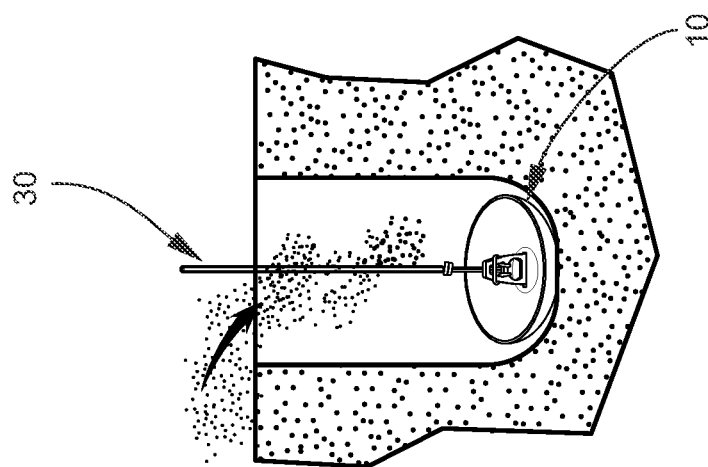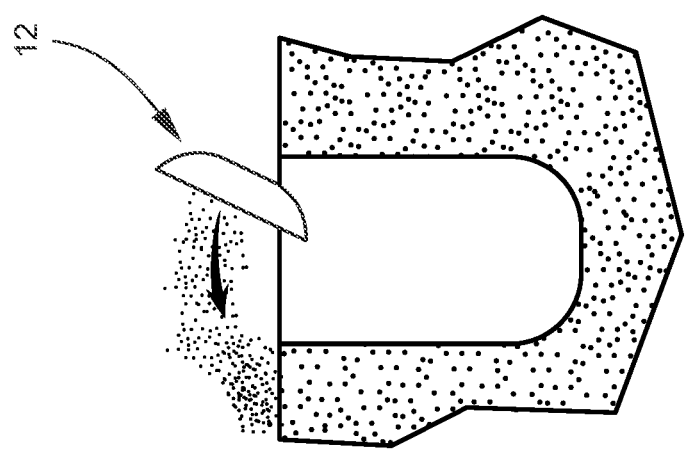
FIG. 20A
FIG. 20B
FIG. 20C

RETAINER APPARATUS

CROSS REFERENCE TO RELATED APPLICATIONS

This application is a Divisional Application of U.S. patent application Ser. No. 15/936,729 filed Mar. 27, 2018, now U.S. Pat. No. 10,973,205, which claims the benefit of priority to U.S. Provisional Application Ser. No. 62/483,581 filed Apr. 10, 2017. The entire disclosure of each of the applications listed in this paragraph are incorporated herein by specific reference thereto.

FIELD OF INVENTION

The present invention relates generally to a retainer apparatus, and more generally relates to a retainer apparatus having a scoop and a retention device for retaining an object.

BACKGROUND AND PRIOR ART

Many people desire to take their dogs to the beach, and most beaches have leash laws requiring dogs to always be leashed. When the individual desires to relax in their chair or lay on a towel, it is not convenient to always retain an end of the leash in the hand. Therefore, the individual will engage the leash to a chair, an umbrella, or a spike with a swivel hook on the end. Unfortunately, a chair, umbrella, or spike are not suitable for securely retaining the dog at the desired location. It is very easy for the dog to create tension in the leash, thus moving the chair or pulling the umbrella or spike out of the ground.

When the dog is not retained on the leash, the dog is likely to chase other dogs, birds, or people on the beach. This is unlawful and not safe for the dog. It is an object of the present invention to provide a dog leash that is retained within the sand on a beach, even if the dog pulls tightly on its leash, and is easy and convenient to install.

Additionally, the user may wish to efficiently and effectively hold an item, such as an umbrella, canopy, cooler, and the like in the sand, dirt, rock, ice or other substance. It is an object of the present invention to allow a user to efficiently and effective retain these items with the use of the retainer apparatus as fully described herein.

SUMMARY OF THE INVENTION

According to an embodiment of the present invention, a retainer apparatus includes a scoop and a retention device with the scoop having an exterior surface and an interior surface with a central opening having a predetermined length. A retention device has a base with a length greater than the length of the central opening of the scoop and a flange portion extends upwardly from the base portion and contains at least one opening.

According to another embodiment of the present invention, the retainer apparatus contains a scoop that is generally circularly shaped.

According to yet another embodiment of the present invention, the retainer apparatus has a scoop that is concave.

According to yet another embodiment of the present invention, the retainer apparatus includes a retention device with a base and a flange.

According to yet another embodiment of the present invention, the retainer apparatus includes a flange with two openings.

According to yet another embodiment of the present invention, the retainer apparatus includes a scoop and retention device composed of metal, plastic and/or wood.

According to yet another embodiment of the present invention, the retainer apparatus includes a scoop that is generally oval shaped.

According to yet another embodiment of the present invention, the retainer apparatus includes a flange that has a first end and a second end, the first end of the flange is engaged to the base and the width of the flange gradually decreases from the first end to the second end.

According to yet another embodiment of the present invention, the retainer apparatus includes a scoop composed of a different material than the retention device.

According to yet another embodiment of the present invention, the retainer apparatus includes a generally concave scoop having an exterior surface and an interior surface with a central opening and a predetermined length. The apparatus has a retention device having a base with a length greater than the length of the central opening of the scoop and a flange portion that extends upwardly from the base portion and contains at least one opening.

According to yet another embodiment of the present invention, the retainer apparatus includes a generally concave scoop having an exterior surface and an interior surface with a central opening and a predetermined length. The retention device has a base with a length greater than the length of the central opening of the scoop and a flange portion that extends upwardly from the base portion and contains two openings.

BRIEF DESCRIPTION OF THE FIGURES

The present invention is illustrated and described herein with reference to the various drawings, in which like reference numbers denote like method steps and/or system components, respectively, and in which:

FIG. 20A is a side view of the scoop being used to dig a hole;

FIG. 20B is a side view of the retainer apparatus within a hole and engaged to a rope;

FIG. 20C is a side view of a retainer apparatus retaining a cooler;

DESCRIPTION OF THE PREFERRED EMBODIMENTS

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
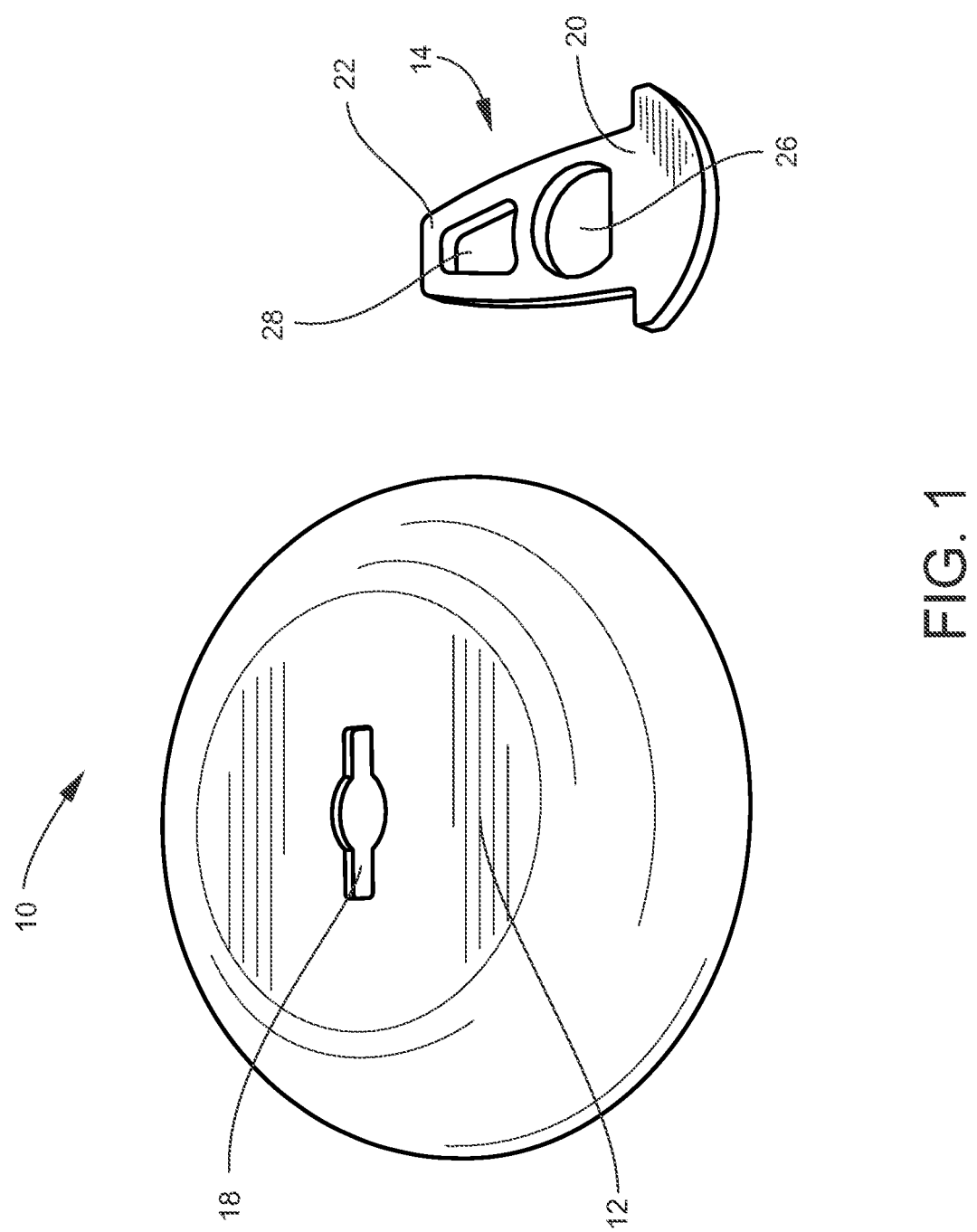
FIG. 1 is a top perspective view of the retainer apparatus.
Figure 2:
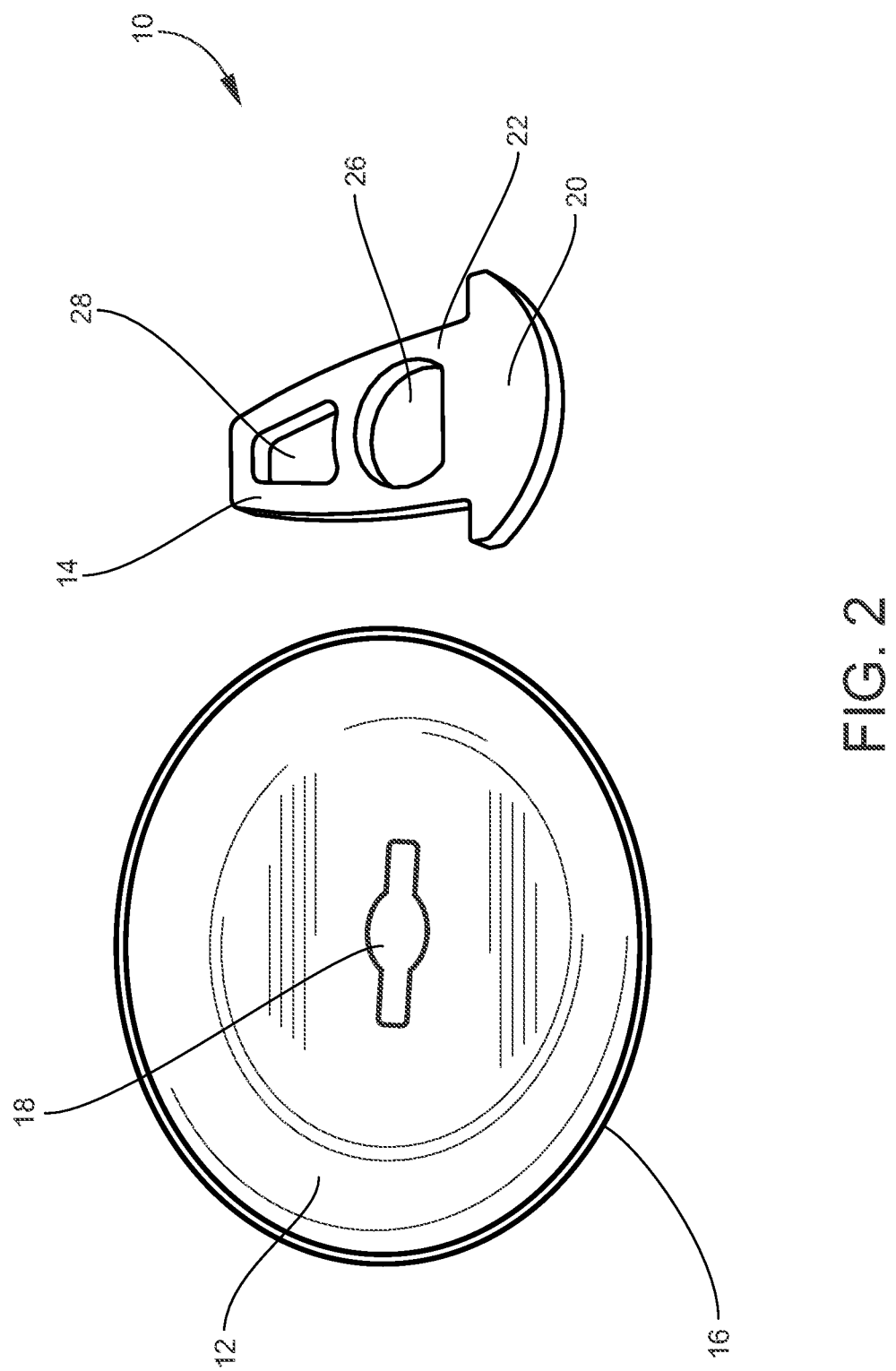
FIG. 2 to top perspective view of the retainer apparatus.
Figure 3:
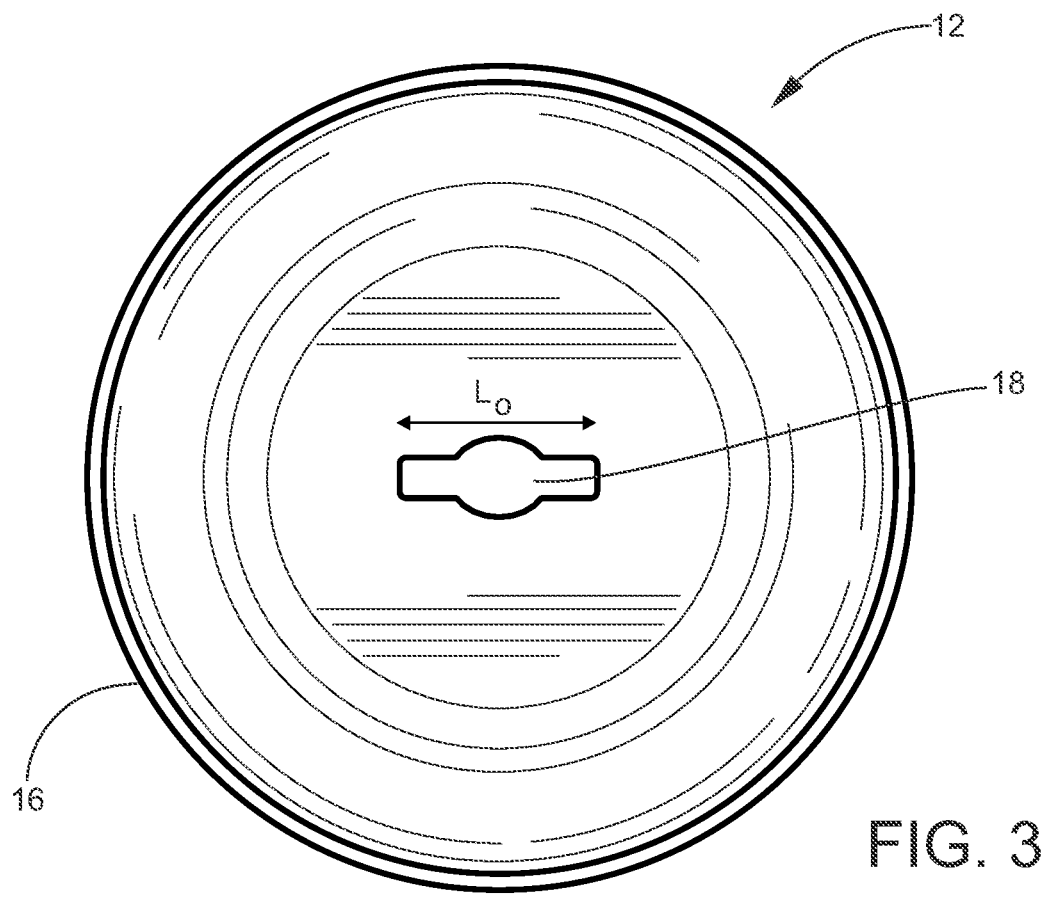
FIG. 3 is a top view of the scoop of the retainer apparatus.
Figure 4:
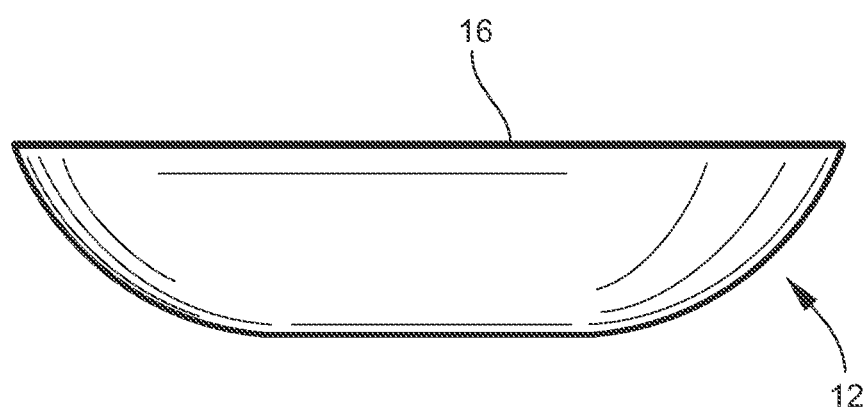
FIG. 4 is a side view of the scoop of the retainer apparatus.

Referring now specifically to the drawings, a retainer apparatus is illustrated in FIGS. 1, 2, 7, 8, and 9 and is shown generally at reference numeral 10. The retainer apparatus 10 consists of a scoop 12 and a retention device 14. The scoop 12 is generally circular having a top side and a bottom side. The top side is concave and shaped generally like a bowl, as shown in FIG. 3. The bottom side is a reverse of the top side and generally convex shaped. On the top side, the scoop 12 contains a base that extends outwardly and upwardly to an outer edge 16, as shown in FIGS. 2, 3, and 4.

An opening 18 is formed within the scoop 12 and preferably within the center of the scoop 12. The opening 18 has a top side to a bottom side on either side of the opening 18. As illustrated, the opening 18 is elongated and extends from a first end to a second end. The first end and the second end of the opening 18 have the same width. The central portion of the opening 18 contains an arcuate portion that gradually increases the width of the opening 18 from the first end to a centralized point and gradually decreases the width of the opening 18 to the second end. The arcuate portion is located on the top side and the bottom side of the opening 18, near the central portion of the opening 18. The scoop 12 may be composed of metal, plastic, wood, or the like.

Figure 5:
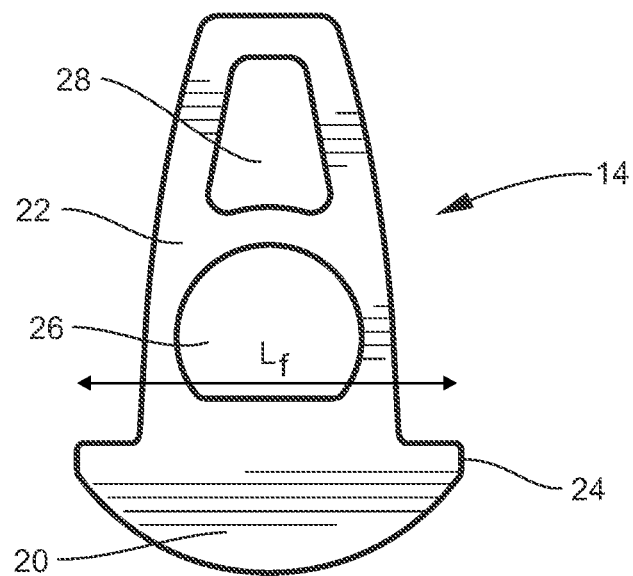
FIG. 5 & FIG. 6 are perspective views of the retention device.
Figure 6:
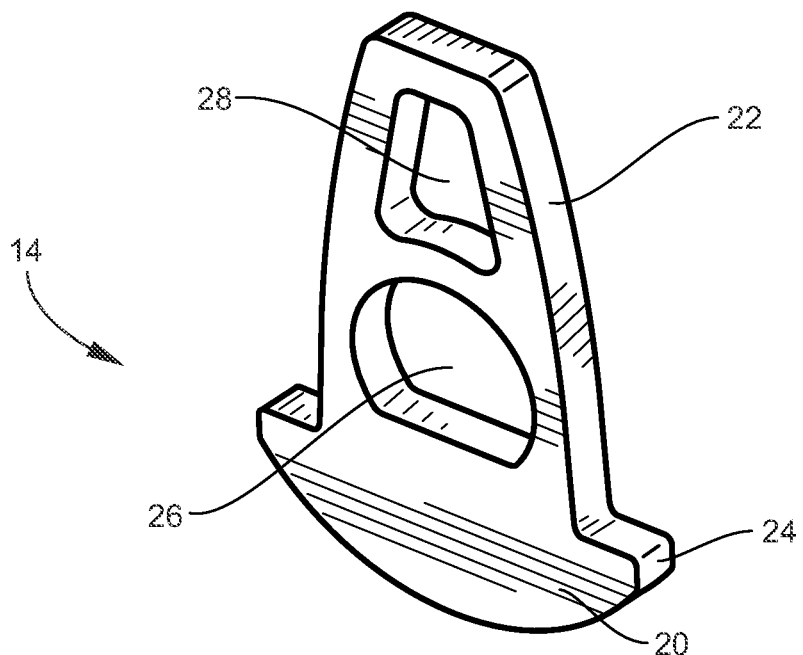

The retention device 14, as illustrated in FIGS. 5 and 6, contains a base 20 with an upwardly extending flange 22. The bottom side of the base 20 is generally curved and extends to two opposed side portions 24, extending from the bottom side of the base 20 to the top side of the base 20. The top side of the base 20 is generally flat. The flange 22 extends upwardly from the top side of the retention device 14. The first side of the flange 22 is engaged to the top side of the base 20. The flange 22 gradually decreases in width until it reaches the second end of the flange 22. The flange 22 includes a first opening 26 and a second opening 28. The first opening 26 is adjacent the first side of the flange 22 and is generally circularly shaped. The second opening 28 is adjacent the second side of the flange 22 and is generally triangularly shaped. It should be noted the first opening 26 and second opening 28 may be any shape as desired by the user. The retention device 14 may be composed of metal, plastic, wood, or the like. In an alternative embodiment, the retention device 14 is composed of a material that is different than the material the scoop 12 is composed. For example, the scoop 12 may be composed of metal and the retention device 14 may be composed of plastic. Alternatively, the scoop 12 may be composed of plastic and the retention device 14 may be composed of metal.

The first opening 26 has a generally flat bottom portion that is in close proximity to the first side of the flange 22 and has a first end and a second end. A side portion extends circularly from the first end to the second end of the bottom portion of the first opening 26. Except for the flat bottom portion, the first opening is generally circular.

The second opening 28 contains a generally concave base portion with a first end and a second end. A first side portion extends upwardly from the first end of the base portion and a second side portion extends upwardly from the second end of the base portion. The first side portion and the second side portion are angled towards each other and the distance between the first side portion and the second side portion decreases as the first side portion and the second side portion extend from the base portion. The first end of the first side portion and the second side portion are engaged to the first end and the second end, respectively, of the base portion. The second end of the first side portion is engaged to a first end of a top portion. The second end of the second side portion is engaged to the second end of the top portion. The length of the top portion is less than the length of the base portion.

Figure 7:
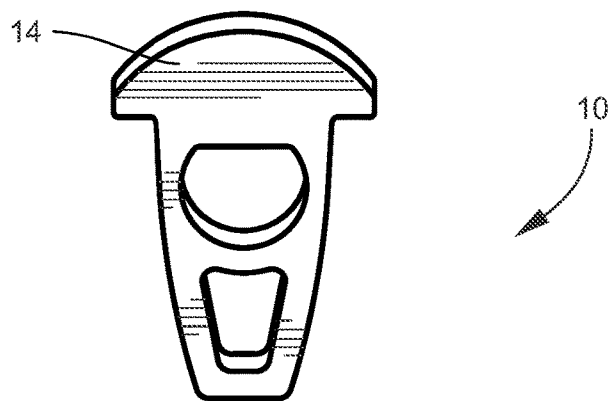
FIG. 7 is a perspective view of the retention device being inserted into the opening of the scoop of the retainer apparatus.

The retention device 14 is inserted into the opening 18 of the scoop 12. As shown in FIG. 7. Specifically, the first side of the flange 22 of the retention device 14 is inserted into the bottom side of the scoop 12 and extends through the top side of the scoop 12. The retention device 14 is pushed through the opening 18 until the flat portion of the base 20 of the retention device 14 engages the bottom side of the scoop 12. The base 20 of the retention device 14 is wider than the width of the opening 18, thus preventing the base 20 from extending through the opening 18. As shown in FIGS. 3 and 5, the flange 22, which has a length ($L_f$) less than the length of the opening ($L_o$), extends through the opening 18, but the base 20 does not.

Figure 8:
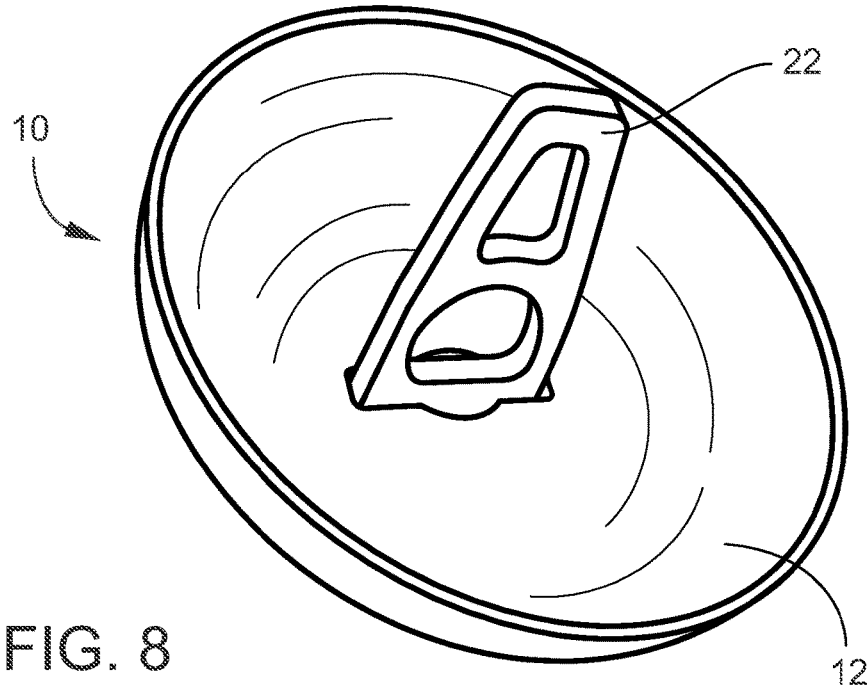
FIG. 8 is a front perspective view of the retainer apparatus.
Figure 9:
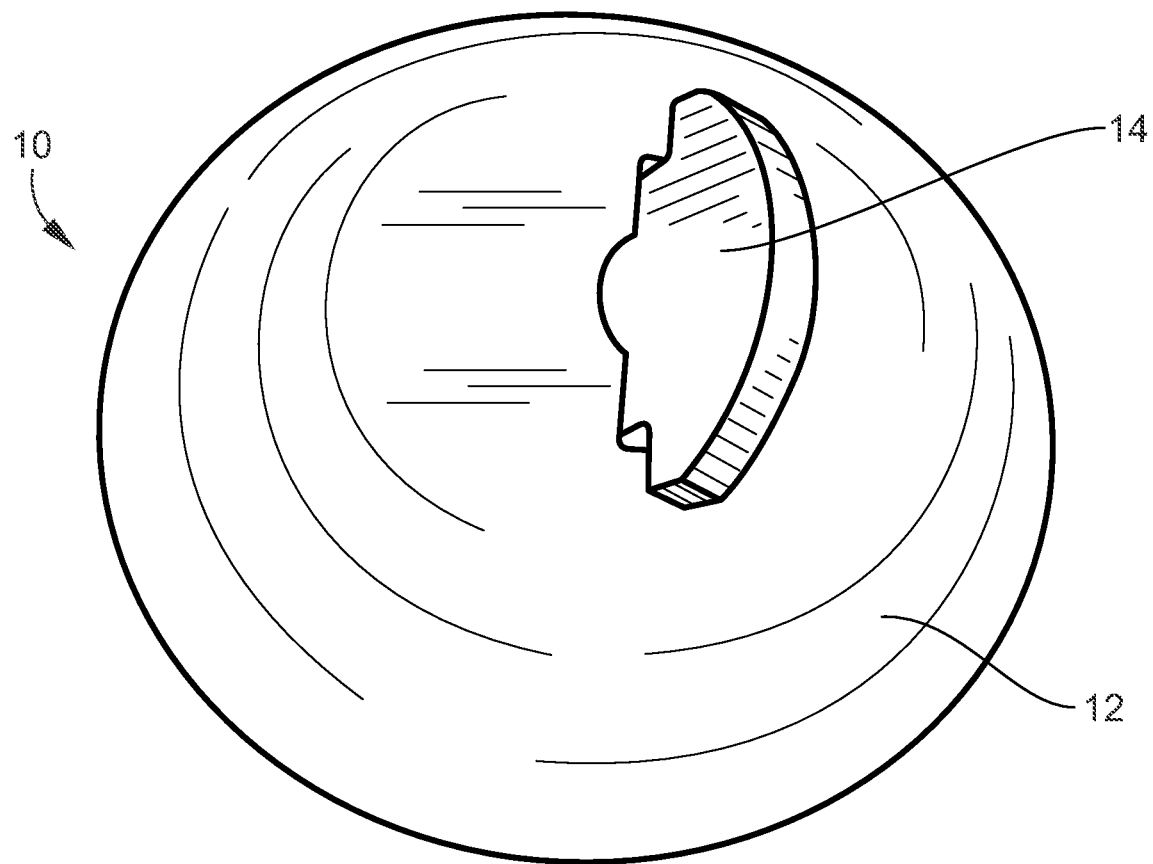
FIG. 9 is a back perspective view of the retainer apparatus.
Figure 10:
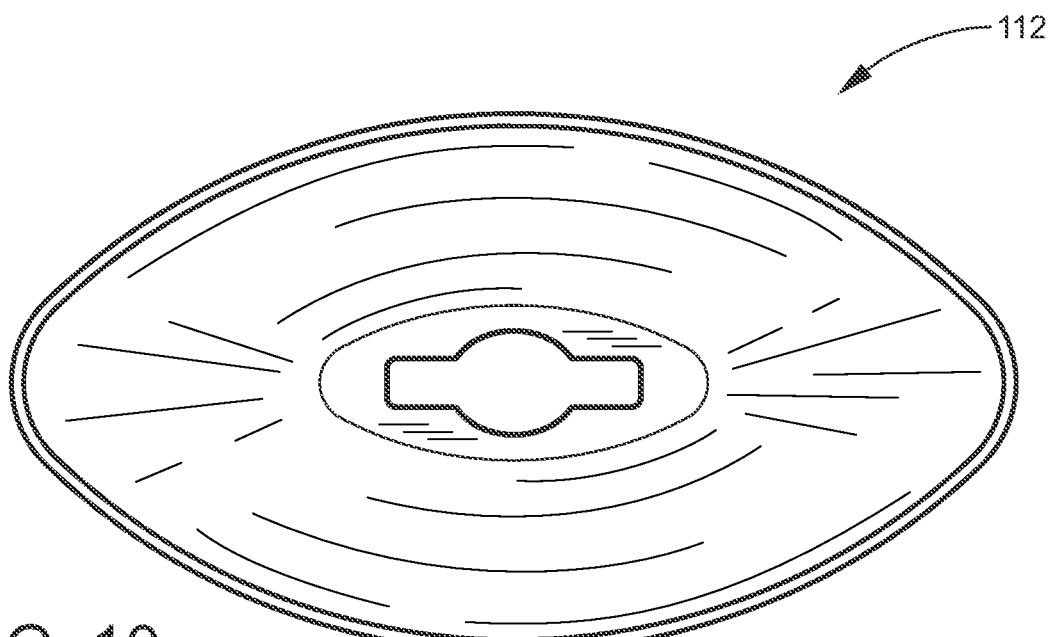
FIG. 10 is a top view of an alternative embodiment of the scoop of the retainer apparatus.
Figure 11:
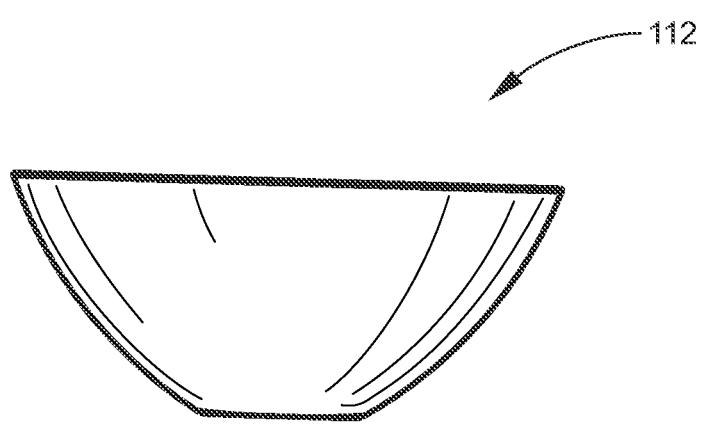
FIG. 11 is a side view of an alternative embodiment of the scoop of the retainer apparatus.
Figure 12:
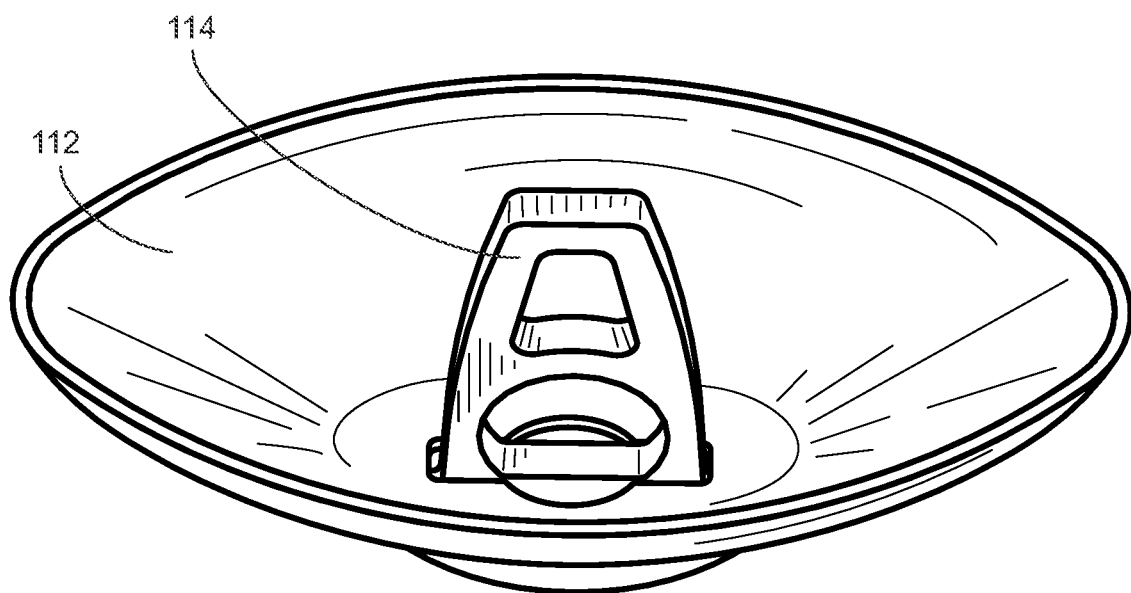
FIG. 12 is a perspective view of the retention device inserted into the alternative embodiment of the scoop of the retainer apparatus.
Figure 13:
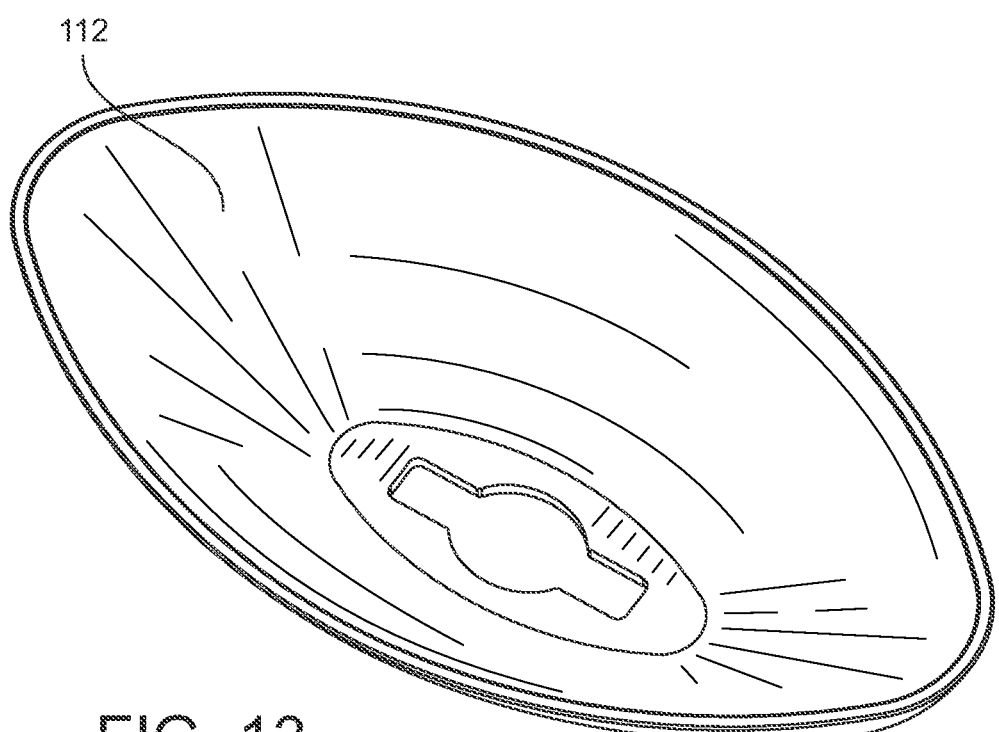
FIG. 13 is a perspective view of an alternative embodiment of the scoop of the retainer apparatus.

During use, a user uses the scoop 12 to dig a hole in sand or dirt, as shown in FIGS. 17A-17D, 19A, 20A, 21A, and 22A. The scoop 12 allows the user to penetrate the sand or dirt, and also to scoop the sand or dirt away forming a hole. Once the hole is dug, the user inserts the retention device 14 through the opening 18 in the scoop 12, as shown in FIGS. 17E, 19B, 20B, 21B, and 22B. The flange 22 is inserted first through the opening and pushed through the opening 18 until the base 20 contacts the scoop as illustrated in FIGS. 7,8, and 9. The base 20 of the retention device 14 engages the bottom side of the scoop 12, preventing the retention device 14 from traveling entirely through the opening 18, as shown in FIG. 9. The apparatus 10 is engaged to a rope 30 or leash 32 and inserted into the hole previously dug by the scoop 12, as shown in FIGS. 17E, 19B, 20B, 20B, and 22B and the dirt or sand is then replaced within the hole and on top of the apparatus 10, as shown in FIGS. 17F, 19C, 20C, 21C, and 22C. In addition to dirt and sand, the apparatus 10 may be used in snow, rocks, and the like.

Figure 21A:
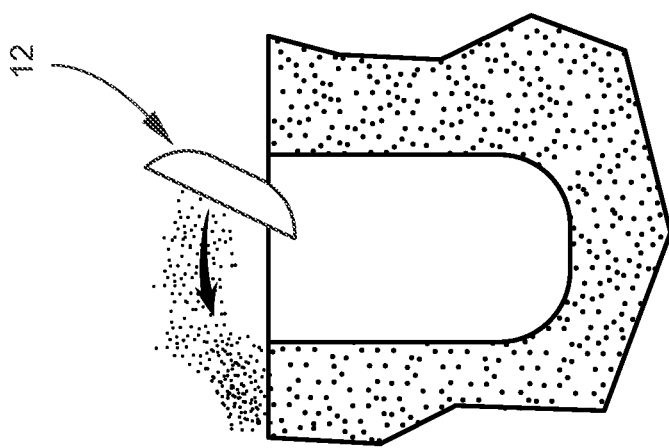
FIG. 21A is a side view of the scoop being used to dig a hole.
Figure 21B:
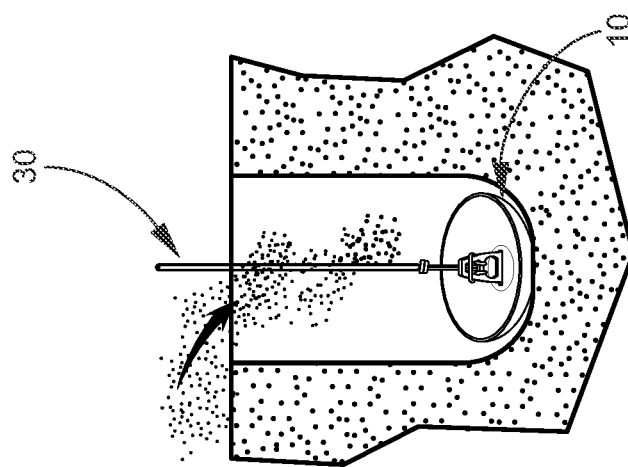
FIG. 21B is a side view of the retainer apparatus engaged to a leash.
Figure 21C:
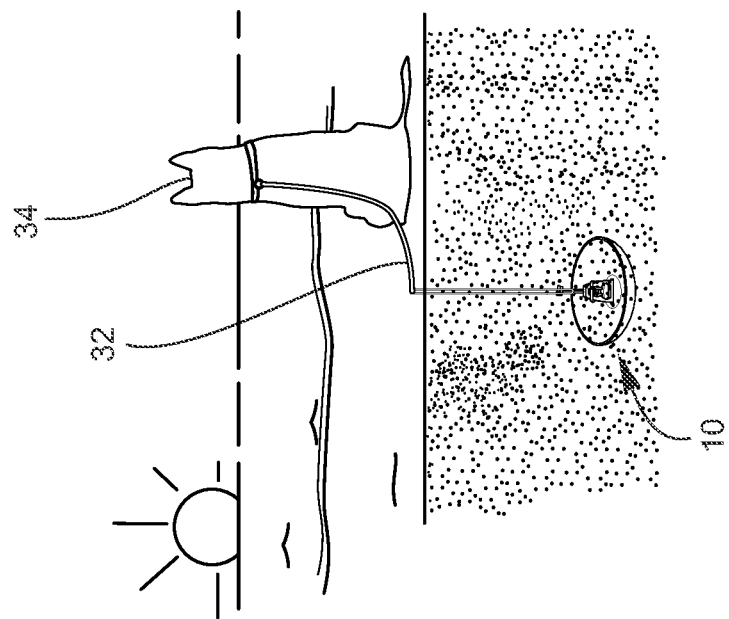
FIG. 21C is a side view of the retainer apparatus retaining a dog.
Figure 22C:
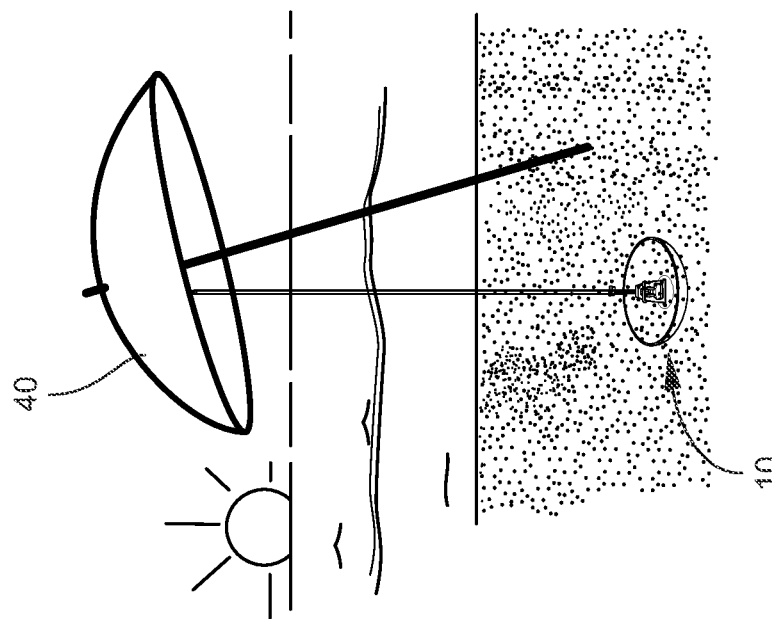
FIG. 22C is a side view of the retainer apparatus retaining an umbrella.
Figure 22B:
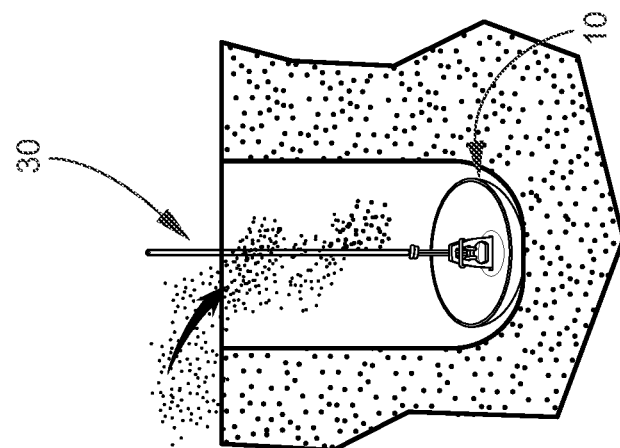
FIG. 22B is a side view of the retainer apparatus engaged to a rope.
Figure 22A:
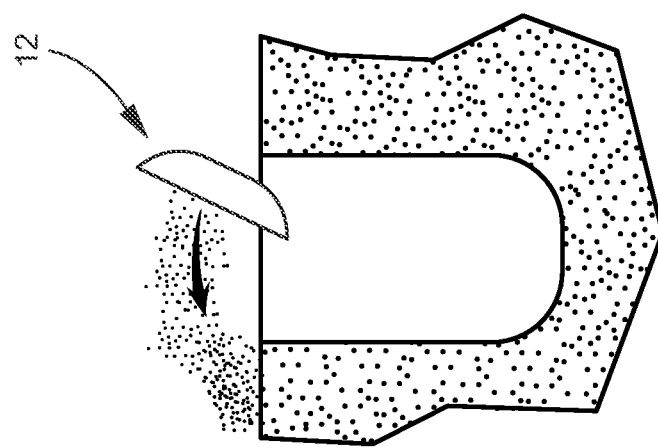
FIG. 22A is a side view of the scoop being used to dig a hole.

As shown in FIG. 21C, a dog leash 32 is engaged to one of the openings (26, 28). The apparatus 10 is then placed within the hole and sand is placed within the hole, burying the apparatus 10 and retaining the apparatus 10 within the hole, as shown in FIGS. 21A and 21B. One end of the dog leash 32 is buried with the apparatus 10, but the opposite side of the leash is retained outside the hole and engaged to a leash of the dog 34, retaining the dog 34 within a confined area near the hole with the apparatus 10 therein. In another embodiment as illustrated in FIGS. 18, 19A-19C, 20A-20C, 22A-22C, an end of a rope 30 is engaged to one of the openings (26,28) and the other end is engaged to canopy 36, cooler 38, or umbrella 40.

Figure 14:
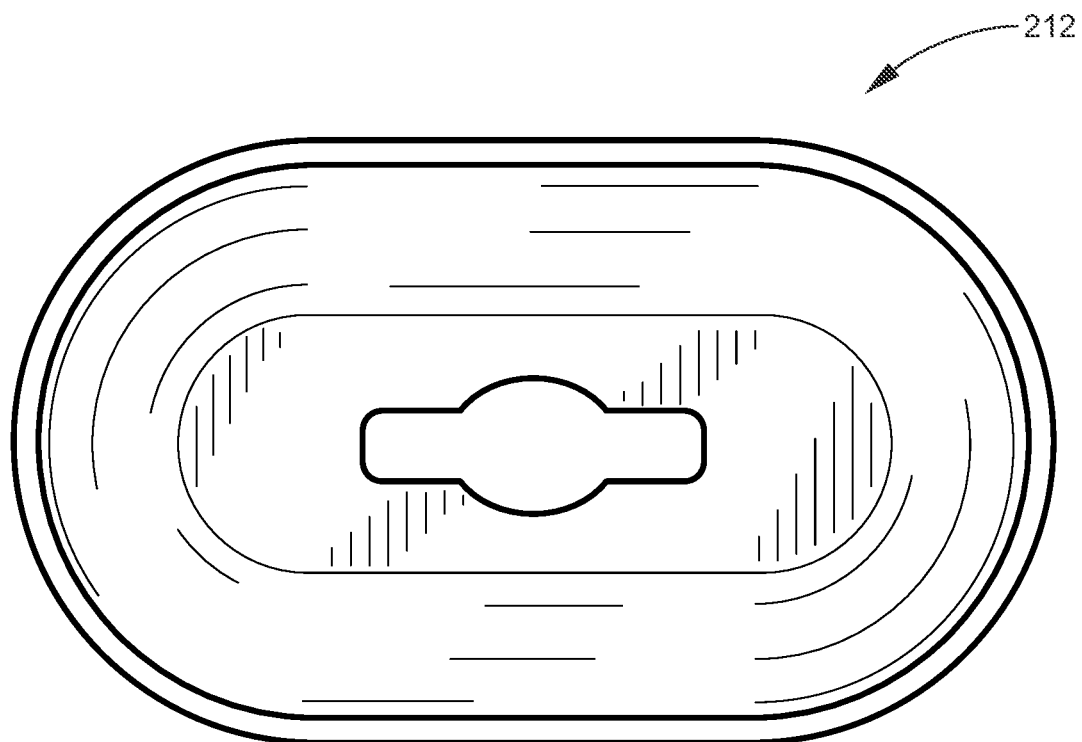
FIG. 14 is a top view of an alternative embodiment of the scoop of the retainer apparatus.
Figure 15:
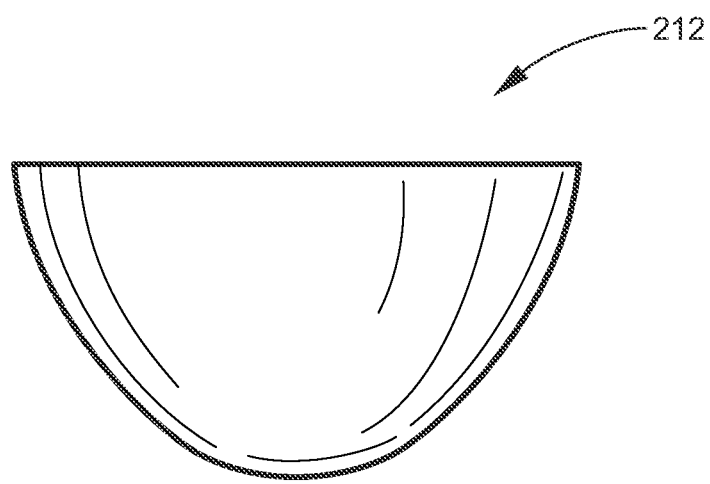
FIG. 15 is a side view of an alternative embodiment of the scoop of the retainer apparatus.
Figure 16:
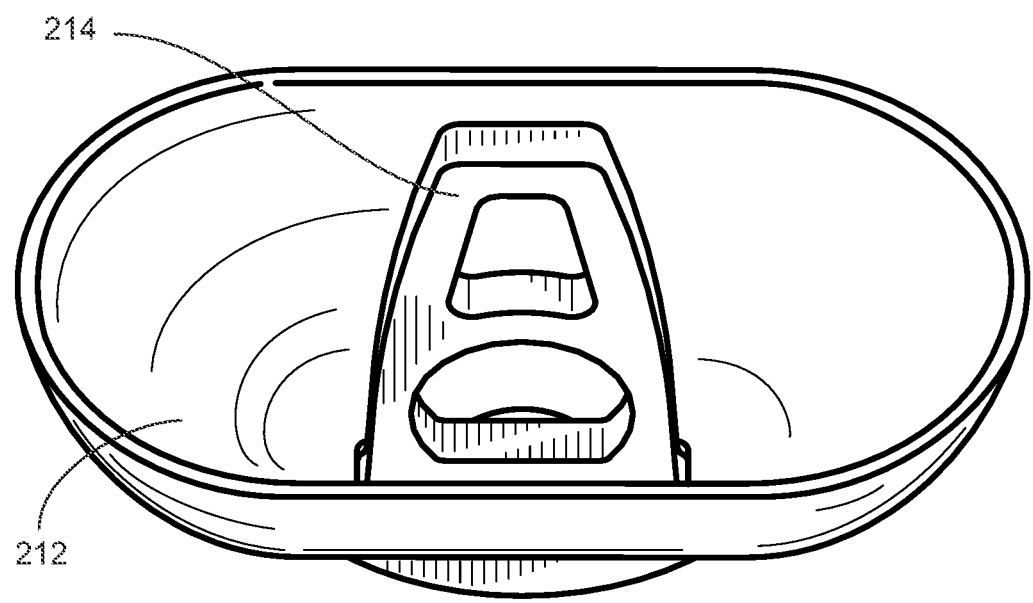
FIG. 16 is a perspective view of a retention device inserted into the alternative embodiment of the scoop of the retainer apparatus.
Figure 17A:
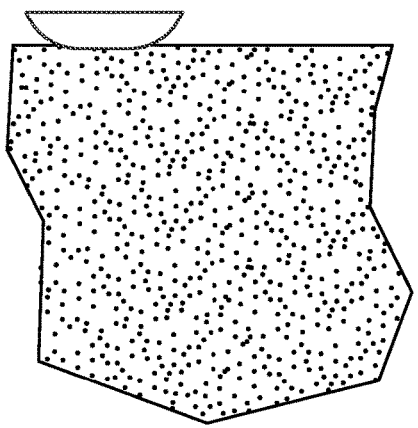
FIG. 17A is a side view illustrating the scoop placed on top of sand.
Figure 17B:
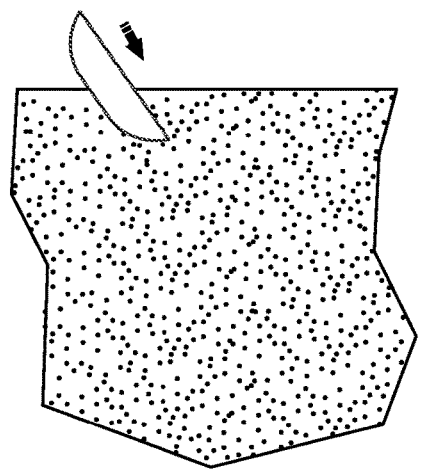
FIG. 17B is a side view illustrating the scoop digging into the sand.
Figure 17C:
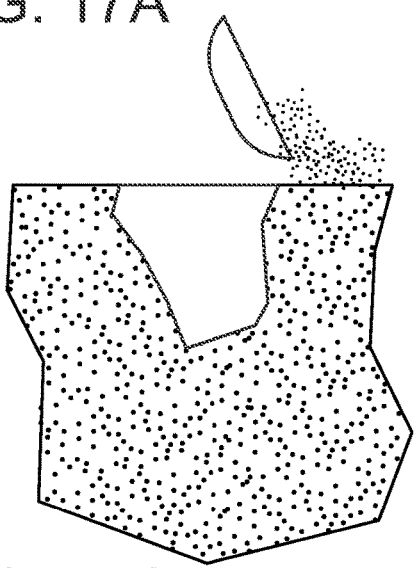
FIG. 17C is a side view of the scoop scooping sand to form a hole.
Figure 17D:
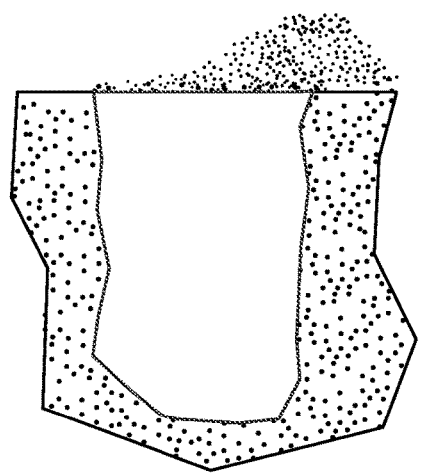
FIG. 17D is a side view of a hole formed by the scoop.
Figure 17E:
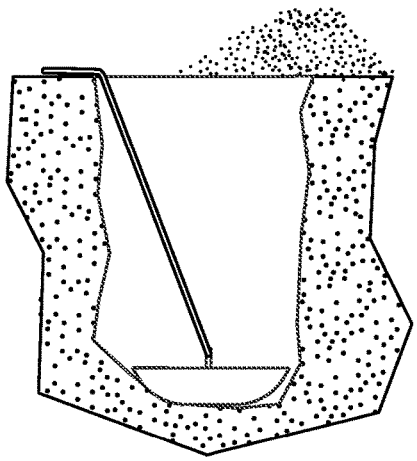
FIG. 17E is a side view of the scoop with rope placed within the hole.
Figure 17F:
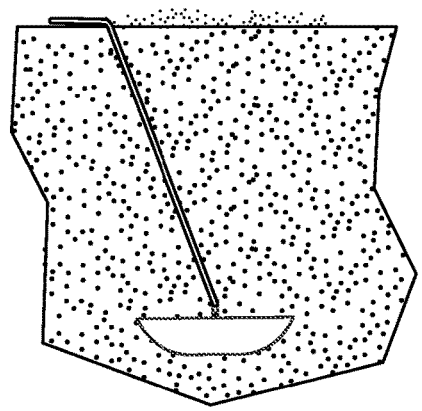
FIG. 17F is a side view of the scoop with rope placed within the hole and sand placed on the scoop and rope.
Figure 18:
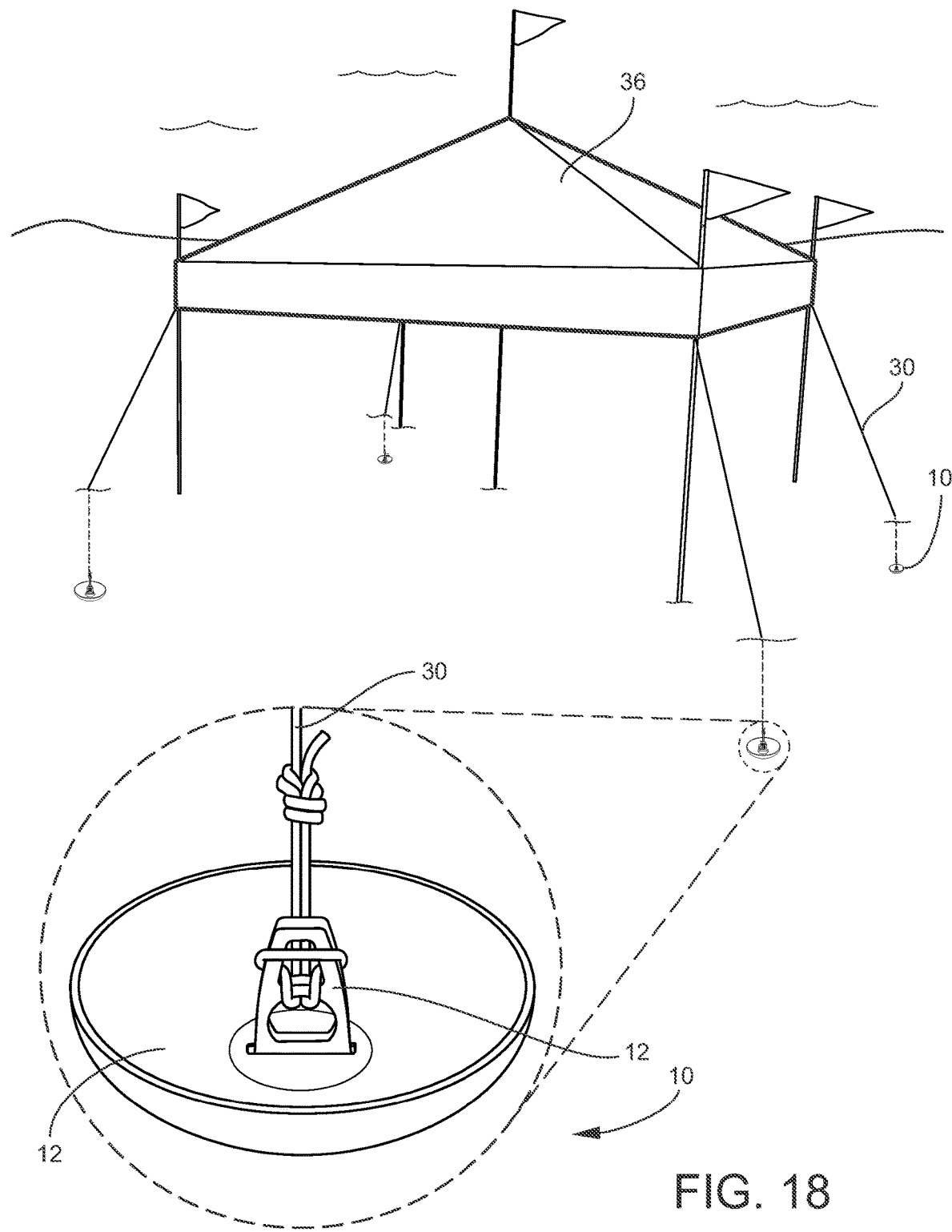
FIG. 18 is a detailed view of the retainer apparatus placed within the sand and retaining one end of a canopy on the ground.
Figure 19A:
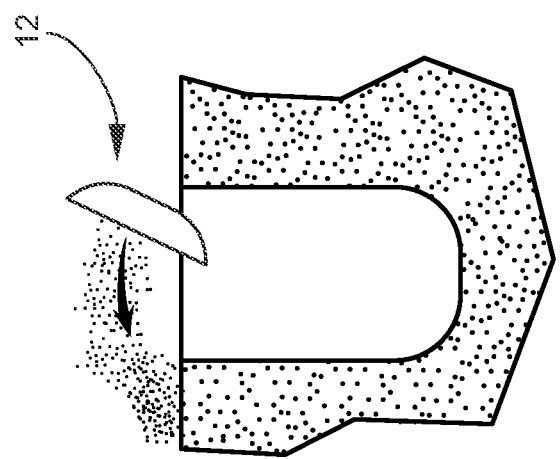
FIG. 19A is a side view of the scoop being used to dig a hole.
Figure 19B:
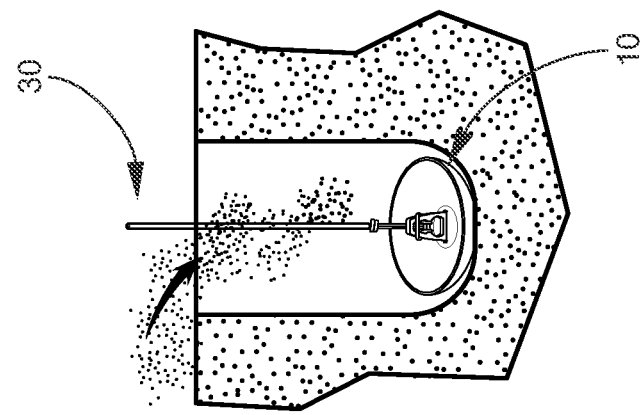
FIG. 19B is a side view of the retainer apparatus within a hole and engaged to a rope.
Figure 19C:
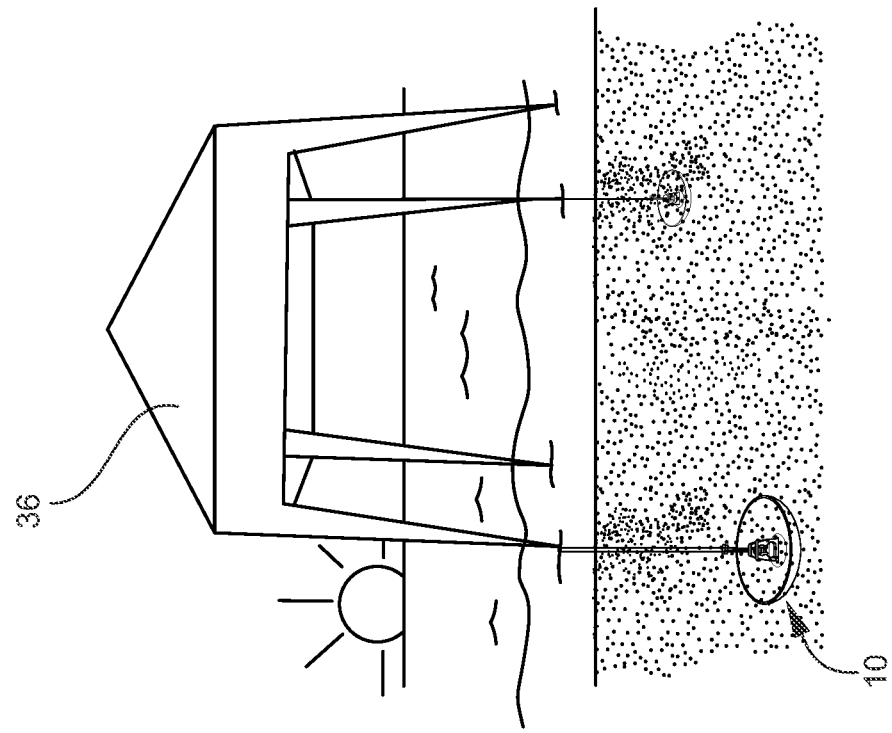
FIG. 19C is a side view of multiple retainer apparatuses retaining a canopy.

As illustrated in FIGS. 10, 11, 12, and 13, the scoop 112 may be shaped like a football having a top side and a bottom side that interconnects at each end forming rounded ends at each end of the scoop 112. The shape is generally oblong. A retention device 114, such as the retention device 14, previously described, can be attached to the scoop 112. As illustrated in FIGS. 14 and 15, the scoop 212 is generally oval shaped. A retention device 214, such as the retention device 14, previously described, can be attached to the scoop 212.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

I claim:
1. A method of anchoring single objects to the ground, consisting of the steps of:
   providing a scoop having an interior curved surface and an exterior curved surface, with a central opening passing from the interior surface through the exterior surface;
   digging a hole in sand or dirt with the scoop;
   providing a single retention device having a triangular flange, the triangular flange having a flat front side and a flat rear side with two opening therethrough passing from the front side to the rear side, the triangular flange having a base with opposite facing outwardly protruding edges;
   inserting the flange of the retention device in the central opening in the scoop;
   providing a single leash having a first end and a second end;
   attaching the first end of a leash to the flange of the retention device;
   burying the scoop in the hole with the sand or dirt; and
   attaching the second end of the leash to a single object adjacent to the buried scoop.

2. The method of claim 1, wherein the inserting step includes the step of:
   pushing a tip of the triangular shaped flange until the outwardly protruding edges of the base abut against portions of the exterior surface of the scoop.

3. The method of claim 1, wherein the step of providing the scoop includes the steps of:
   providing the interior curved surface of the scoop with a concave surface; and
   providing the curved exterior surface of the scoop with a convex surface.

4. The method of claim 1, wherein the step of providing the scoop includes the step of:
   providing the central opening with an elongated rectangular shape and a circular middle shape.

5. The method of claim 1, wherein the step of providing the scoop includes the step of:
   providing the scoop with a generally circular shape.

6. The method of claim 1, wherein the step of providing the scoop includes the step of:
   providing the scoop with a generally oval shape.

7. The method of claim 1, wherein the single leash includes a rope.

8. The method of claim 1, wherein the single object is selected from at least one of: a canopy, a cooler, an umbrella and a dog.

9. A method of securing a single loose item to a single anchor, consisting of the steps of:
   providing a single scoop with a central opening;
   scooping out sand or dirt with the single scoop to form a hole;
   providing a single retention device with a triangular flange having a flat base and outwardly protruding edges, the triangular flange having two through-holes;
   inserting the triangular flange of the single retention device into the central opening of the scoop until the retention device is prevented from being removed from the scoop;
   attaching a single leash or rope to the retention device;
   inserting the scoop with the inserted retention device into the hole;
   burying the single scoop with the inserted retention device with the scooped out sand or dirt; and
   securing another end of the single leash or rope to a single loose item.

10. The method of claim 9, wherein the single loose item is selected from a single canopy, a single cooler, a single umbrella and a single dog.

11. The method of claim 9, wherein the single scoop and the single retention device are plastic.

12. The method of claim 9, wherein the single scoop is a circular shape.

13. The method of claim 9, wherein the single scoop is an oval shape.

14. The method of claim 9, wherein the inserting step includes the step of:
pushing a tip of the triangular shaped flange until the outwardly protruding edges of the base abut against portions of the exterior surface of the single scoop.

15. A method for anchoring single objects to the ground, consisting of the steps of:
providing a single scoop having an interior concave curved surface and an exterior convex curved surface, with a central opening passing from the interior surface to the exterior surface;
digging a single hole in sand or dirt with the single scoop;
providing a single retention device having a triangular flange on a base, the triangular flange having a flat front side and a flat rear side with at least one opening therethrough passing from the front side to the rear side, the base having opposite facing outwardly protruding edges;
inserting the triangular flange of the retention device into the central opening in the scoop;
providing a single leash having a first end and a second end;
attaching the first end of a single leash to the at least single opening in the flange of the retention device;
burying the single scoop with the retention device in the hole with the sand or dirt; and
attaching the second end of the single leash to a single object adjacent to the buried scoop, so only the single object is anchored to the ground.

* * * * *